UNITED STATES PATENT OFFICE 2,267,224

PROCESS OF STABILIZING SHORTENING

Alonzo E. Taylor and Jakob L. Jakobsen, Minneapolis, Minn., assignors to General Mills, Inc., a corporation of Delaware No Drawing. Application September 9, 1940, Serial No. 356,042

3 Claims. (Cl. 99—163)

The present invention relates to an improved process of treating edible fats and oils and more particularly to a process of stabilizing shortening products such as lard against rancidity and to the stabilized product of such a process.

The principal object of our invention is to provide a process for stabilizing edible fats and oils such as lard, beef fat, partially hydrogenated oleo oil, and other vegetable and animal fats and oils against rancidity.

A further object of our invention is to provide as an article of commerce an improved shortening product stabilized against rancidity by the incorporation therein of a substantially pro-oxidant free tocopherol concentrate.

Another object of our invention is to provide an effective and economical process for the stabilization of shortening against rancidity which comprises adding thereto and incorporating therewith a substantially pro-oxidant free anti-oxidant concentrate containing tocopherol.

A still further object of our invention is to provide a novel and inexpensive process for the stabilization of shortening against rancidity which comprises nullifying or removing pro-oxidants from the shortening and then adding thereto and incorporating therewith a substantially pro-oxidant free anti-oxidant concentrate containing substantial amounts of gamma tocopherol.

For the purpose of illustration, but not by way of limitation, the invention is hereinafter described as practiced with lard. As is well known, lard like other of the animal and vegetable oils and fats, tends to become rancid when exposed to atmospheric oxygen. The effect of various substances of a chemical nature in promoting or retarding the tendency of fats and oils to become rancid has been studied by numerous investigators and the chemical literature abounds with reports on this subject.

Tocopherol is known to be an antioxidant but it has always been used for antioxidant purposes as a pure or highly purified substance made by the tedious and costly process of saponifying tocopherol-containing oil or fat and then isolating the unsaponifiable portion thereof from which the tocopherol then was isolated by further processing, either in pure or highly concentrated form. Pure tocopherol is very expensive, for example, alpha tocopherol is now commercially available at a price of $4 per gram or about $1800 per pound.

We have found that tocopherol is active in much less concentrated form such as in distillates derived from the molecular distillation of crude vegetable oils, as for instance, corn oil where the gamma tocopherol predominates. This discovery makes commercial utilization of tocopherol possible.

The present invention is based upon the discovery that the induction period of shortening such as lard may be greatly enhanced and that its tendency to become rancid, when exposed to oxidative conditions, may be substantially retarded by treating the shortening to nullify or eliminate pro-oxidants contained therein, as by the hydrogenation thereof and by then adding a substantially pro-oxidant free antioxidant concentrate containing substantial amounts of tocopherol thereto, the antioxidant concentrate preferably having been previously treated, as by hydrogenation, to nullify or eliminate pro-oxidants contained therein.

Various strengths of concentrates containing tocopherol may be used but when added to lard in amounts corresponding with the same amount of tocopherol, approximately the same degree of protection was obtained. Surprisingly efficient protection was obtained by adding the concentrate to hydrogenated lard. As tocopherals are saturated compounds, they are not affected by hydrogenation and generally it is not particularly significant whether the tocopherol-containing concentrates are mixed with the lard before or after hydrogenation or they may themselves be previously hydrogenated or otherwise processed, as will presently be more fully described, in order to eliminate or nullify pro-oxidants contained therein.

Tocopherol is found in various plants, oil-seeds, etc., such as soybeans, wheat germ, corn and many others. It is generally recognized that it may appear in the form of three homologues, viz: the alpha, beta, and the gamma forms. They are all oil-soluble and may be isolated or contrated in different ways such as by treating the tocopherol-containing oil with extractants, by saponifying the tocopherol-containing oil and subsequently extracting or isolating the non-saponifiable portion thereof, by molecular distillation either of the non-saponifiable portion of a tocopherol-containing oil, or by molecular distillation of a crude or refined vegetable oil.

The three forms of tocopherol, as mentioned above, differ in their action. The alpha tocopherol is physiologically the most active (in vitamin E properties) and probably about three times as active as the gamma form, whereas the gamma form is the most active as an antioxidant, probably about three times as active as the alpha form. The beta tocopherol seems to occupy a position between the two others in so far as its antioxidant properties are concerned.

In isolating the tocopherol from vegetable oils containing the same it is at the present stage of the technique involved, generally too costly, when the tocopherol is to be applied on a large scale, to make a pure product or to carry the concentration of the product too far. When the concentration process is only partially completed, there is the disadvantage that the concentrates may contain not only material or compounds which may be inert as antioxidants, but also compounds which are pro-oxidants and therefore defy partly or wholly the efforts made to remove them in concentrating the antioxidant.

We have made the discovery that we can counteract or eliminate the effect of such harmful pro-oxidant compounds, the nature, composition or chemical structure of which is not known.

In practicing our invention, we may first take a suitable fat, such as prime steam lard, or any other commercial grade of lard and alkali-refine it by conventional methods to remove free fatty acids and impurities therefrom, thereby producing a clear, neutral fat, or we may use such a fat without refining it where it is so pure that refining thereof is not required. In either case, the fat may be further processed, or treated, such as by hydrogenation and/or deodorization, using conventional methods and equipment. If it is desired to deodorize the fat, it may have live steam blown therethrough for from 2 to 6 hours, while maintaining the fat under a reduced pressure until odoriferous compounds associated with the fat are removed therefrom.

If it is desired to remove pro-oxidants from the fat or lard prior to the addition of a tocopherol concentrate thereto, such removal may be accomplished by the addition of adsorptive chemicals thereto, by the use of suitable extractants, or by slight hydrogenation thereof. The hydrogenation of the fat or lard may be accomplished as follows:

The lard is melted and placed in a closed vessel or autoclave and a suitable amount of a catalyst such as a nickel catalyst, is mixed with it, air is evacuated from the vessel, and hydrogen gas is introduced into the vessel until a pressure of about 60 lbs. per square inch is attained therein. The temperature of the lard in the vessel is then raised to about 125° C. to 200° C. while agitating the lard and the catalyst in the vessel by any suitable means. When a sufficient amount of hydrogen has been absorbed by the lard and the iodine number of the lard has dropped 10 to 15 units, the hydrogenation is stopped, the hydrogen is evacuated from the vessel, and the mixture is cooled to a temperature of about 60° C. while agitating it. Air is then admitted to the vessel, the mixture of lard and catalyst is then removed from the vessel, and the mixture is filtered by any suitable means, such as by pumping it through a filter press, to separate the catalyst from the lard. The lard must then be deodorized in the manner described above, to provide a bland, odorless, and tasteless product.

A suitable amount of tocopherol concentrate, such as those previously described, may then be added either to hydrogenated or to unhydrogenated lard. For example, to 100 pounds of unhydrogenated alkali-refined lard, we added .143 lb. of a concentrate which contained 14%, by weight, of tocopherol thus incorporating 0.02 lb. of tocopherol per 100 lbs. of lard and this increased the stability of the lard from 3.7 hours to 21.7 hours, when the lard was exposed to the hereinafter described stability test.

As a further example of our process, a smaller quantity of tocopherol concentrate, but more potent in strength was added to the lard. For instance, to 100 pounds of alkali-refined, unhydrogenated lard, we added .06 pound of a concentrate which contained 34%, by weight, of tocopherol thus incorporating 0.02 lb. of tocopherol per 100 lbs. of the lard and this increased the stability of the lard from 3.7 hours to 20.5 hours, as determined by stability tests.

If it is desired to remove pro-oxidants from the tocopherol concentrate prior to its addition to the fat or lard, such removal may be accomplished by the addition of adsorptive chemicals thereto, by the use of suitable extractants, or by substantial hydrogenation, or by a suitable combination of these methods. The hydrogenation of the tocopherol concentrate may be accomplished substantially in the manner described above for lard except that as antioxidant concentrates are more difficult to hydrogenate than lard, it is necessary to employ substantially more nickel catalyst, say, from .1%, by weight, to ½%, by weight, of nickel catalyst computed as metallic nickel. It is also necessary to hydrogenate for a longer length of time, say, from 1 to 6 hours in order to accomplish a substantial drop in iodine value. For example, when the iodine number of the tocopherol concentrate has dropped 30 to 35 units, by hydrogenation, we have found that pro-oxidants are completely eliminated.

We have found that highly satisfactory results are attained in the stabilization of lard when a suitable amount of unhydrogenated tocopherol concentrate is added to hydrogenated lard, which has been hydrogenated as described above. For example, to 100 pounds of hydrogenated lard, we added .143 lb. of a concentrate which contained 14%, by weight, of tocopherol, thus incorporating in the lard .02 lb. of tocopherol and thereby increasing the stability of the lard from 3.7 hours to 61 hours.

As a further example showing the stabilizing action of tocopherol concentrates upon hydrogenated lard, we added to 100 pounds of hydrogenated lard, .06 lb. of a concentrate which contained 34%, by weight, of tocopherol thus incorporating in the lard .02 lb. of tocopherol and thereby increasing the stability of the lard from 3.7 hours to 70 hours.

We have also found that satisfactory results are attained in the stabilization of lard when a suitable amount of hydrogenated tocopherol concentrate is added to hydrogenated lard. For example, to 100 pounds of hydrogenated lard, we added .143 lb. of a concentrate which had been previously hydrogenated, as described above, and which contained 14%, by weight, of tocopherol, thus incorporating in the lard .02 lb. of tocopherol and thereby increasing the stability of the lard from 3.7 hours to 65 hours.

As a further example showing the stabilizing effect of the addition of a hydrogenated tocopherol concentrate to a hydrogenated fat, we added to 100 pounds of hydrogenated lard, .06 lb. of a hydrogenated tocopherol concentrate which contained 34%, by weight, of tocopherol thus incorporating .02 lb. of tocopherol in the lard and thereby increasing the stability of the lard from 3.7 hours to 70 hours.

As an alternative to the processes described above, we have found that improved results may be attained in the stabilization of lard, by mixing together suitable amounts of unhydrogenated tocopherol concentrate with suitable amounts of unhydrogenated lard and then hydrogenating the mixture simultaneously in a single operation, the hydrogenation being carried out in the same manner as described above for lard. For example, to 100 pounds of alkali-refined, unhydrogenated lard we added .8 lb. of unhydrogenated tocopherol concentrate containing 14%, by weight, of tocopherol thus incorporating in the lard .11 lb. of tocopherol, and we then hydrogenated the mixture in the usual manner until the iodine number of the mixture had dropped 11 units, the mixture was then cooled and filtered in the usual manner. According to the usual stability test, it was found that the stabiltiy of the lard was increased from 4 hours to 55.5 hours.

The following table sets forth data on actual tests carried out to demonstrate the value of the present invention in the stabilization of lard:

| Stability | Sample No. | Sample description | Percent tocopherol (in lard) |
|---|---|---|---|
| 8 | 0 | P. S. lard (Swift) | |
| 3.7 | 1 | P. S. lard, alkali refined | |
| 23.5 | 2 | (1) +0.8% corn oil antioxidant (2.6%) | 0.02 |
| 22.5 | 3 | (1) +1.2% corn oil antioxidant | 0.03 |
| 21.7 | 4 | (1) +0.143%—14% concentrate | 0.02 |
| 18.2 | 5 | (1) +0.429%—14% concentrate | 0.06 |
| 13.5 | 6 | (1) +0.644%—14% concentrate | 0.09 |
| 20.5 | 7 | (1) +0.060%—34% concentrate | 0.02 |
| 15.2 | 8 | (1) +0.180%—34% concentrate | 0.06 |
| 12.7 | 9 | (1) +0.270%—34% concentrate | 0.09 |
| 15.0 | 10 | (1) hydrogenated | |
| 51.5 | 11 | (10) +0.8% corn oil antioxidant | 0.02 |
| 53.7 | 12 | (10) +1.2% corn oil antioxidant | 0.03 |
| 61.0 | 13 | (10) +0.143%—14% concentrate | 0.02 |
| 59.0 | 14 | (10) +0.429%—14% concentrate | 0.06 |
| 50.2 | 15 | (10) +0.644%—14% concentrate | 0.09 |
| 70.0 | 16 | (10) +0.060%—34% concentrate | 0.02 |
| 53.5 | 17 | (10) +0.180%—34% concentrate | 0.06 |
| 42.5 | 18 | (10) +0.270%—34% concentrate | 0.09 |
| 46.0 | 19 | (10 +0.8% hydrogenated corn oil antioxidant | 0.02 |
| 45.7 | 20 | (10) +1.2% hydrogenated corn oil antioxidant | 0.03 |
| 65.5 | 21 | (10) +0.143% hydrogenated, 14% concentrate | 0.02 |
| 72.0 | 22 | (10) +0.429% hydrogenated, 14% concentrate | 0.06 |
| 79.0 | 23 | (10) +0.644% hydrogenated, 14% concentrate | 0.09 |
| 70.0 | 24 | (10) +0.060% hydrogenated, 34% concentrate | 0.02 |
| 69.0 | 25 | (10) +0.180% hydrogenated, 34% concentrate | 0.06 |
| 72.0 | 26 | (10) +0.136%—14.7% concentrate | 0.02 |
| 82.0 | 27 | (10) +0.204%—14.7% concentrate | 0.03 |
| 90.0 | 28 | (10) +0.408%—14.7% concentrate | 0.06 |

In the above table, the figures in the first column designated "stability" give the life of the sample in hours when the sample is subjected to the oxidative effect of a current of air at an elevated temperature. When a peroxide number of 20 was attained, the time was noted and the test was stopped. The time elapsed is that given in the table. The apparatus utilized in these stability tests was that known as the "Swift" stability-testing apparatus. The temperature of the lard tested was kept at 98° C. and all the tests were conducted under the conditions specified for these tests in the literature.

The figures in the second column, in the above table, simply give the number of the samples tested.

In the third column of the above table, the numbers in parentheses refer to the numbers in the second column. For example, (1) +0.143%—14% concentrate means that the concentrate was added to the sample designated as #1 in the second column. The percentages given in the third column indicate the amounts of the various concentrates which were added to the lard in order to have the lard contain the amounts of tocopherol which are given in the fourth or last column. For example, take sample #5. To this sample was added 0.429% of the concentrate containing 14% tocopherol thereby giving 0.06% tocopherol in the sample.

In the fourth column of the above table, the figures given indicate actual contents of tocopherol in the lard samples as subjected to the above-described stability tests.

Four concentrates of tocopherol were used in some of our stability tests, as follows:

(1) A concentrate made by molecular distillation of crude corn oil and containing 2.56% tocopherol.

(2) A concentrate made from the above concentrate 1 by treatment with methanol, chilling and filtering whereby non-tocopherol constituents were removed and the content of tocopherol was increased to 14.7%.

(3) A concentrate made from vegetable oils by molecular distillation and containing 14% tocopherol.

(4) A concentrate made from vegetable oils by molecular distillation and containing 34% tocopherol.

The concentrates 1, 3 and 4 still contained pro-oxidants, sterols, hydrocarbons and/or other compounds, the nature, composition or chemical formula of which are not known except that they are inactive as antioxidants or even counteract, nullify, inhibit, or prevent the protective action of tocopherol when such concentrates are added to the lard or fat.

Our experiments proved the interesting but disappointing fact that these three concentrates when added to the fat gave the mixture less stability as the amount of concentrate was increased. This is illustrated in the above-mentioned table in the data showing the use of the 14% tocopherol concentrate in samples #4, #5, and #6, and also when the same concentrate was added to the hydrogenated fat as shown by samples #13, #14, and #15.

However, when we hydrogenated the tocopherol concentrate and then added it to the hydrogenated fat, we observed increased stability of the fat when increasing amounts of concentrate were added thereto as is shown by the data given for samples #21, #22, and #23 in the above-mentioned table.

The number 2 concentrate which was purified, as described above, apparently contained a lower amount of pro-oxidants than either concentrates numbers 1, 3, and 4, as evidenced by the fact that increasing amounts of the number 2 tocopherol concentrate in the fat samples gave increased stability as is shown by the data given for samples #26, #27, and #28 in the above-mentioned table.

All of our tocopherol-containing concentrates which were made by molecular distillation of suitable material were free from lecithin or cephalin as such compounds are non-distillable under prevailing conditions in the molecular still.

Tocopherol concentrates used in our process may be produced by other methods than molecular distillation. For example, such concentrates may be produced by the solvent extraction of suitable vegetable materials.

While the invention has been described in detail with specific examples, such examples are illustrative and are not given as limitations, since other modifications within the spirit and scope of the invention will be apparent to those skilled in the art. Hence, the invention is to be understood as limited only as indicated in the appended claims, in which the intent is to set forth all the novelty over the prior art.

We claim as our invention:

1. The process of stabilizing shortening against rancidity which comprises hydrogenating a crude tocopherol containing concentrate, which includes a minor percentage of tocopherol, to render ineffective the pro-oxidant compounds therein without destroying the tocopherol, to prepare a composition in which the tocopherol constitutes the predominant antioxidant in the concentrate, and adding a small amount of said composition to a shortening to stabilize the same.

2. A process of stabilizing shortening against rancidity which comprises adding thereto a small amount of crude tocopherol concentrate, said concentrate including a minor percentage of tocopherol, said tocopherol constituting the predominant antioxidant in the concentrate, and hydrogenating the shortening and the concentrate to destroy pro-oxidant compounds without destroying the tocopherol.

3. The process of stabilizing shortening against rancidity which comprises hydrogenating a crude tocopherol containing concentrate, which includes a minor percentage of tocopherol, to render ineffective the pro-oxidant compounds therein without destroying the tocopherol, to prepare a composition in which the tocopherol constitutes the predominant antioxidant in the concentrate, and adding a small amount of said composition to a hydrogenated shortening to stabilize the same.

ALONZO E. TAYLOR.
JAKOB L. JAKOBSEN.